(No Model.) 2 Sheets—Sheet 1.

E. S. GRAVER.
PIPE COUPLING FOR CAR HEATERS.

No. 418,408. Patented Dec. 31, 1889.

WITNESSES:
N. R. Adams.
C. Sedgwick.

INVENTOR:
E. S. Graver
BY
Munn & Co.
ATTORNEYS.

N. PETERS, Photo-Lithographer, Washington, D. C.

(No Model.) 2 Sheets—Sheet 2.
E. S. GRAVER.
PIPE COUPLING FOR CAR HEATERS.
No. 418,408. Patented Dec. 31, 1889.
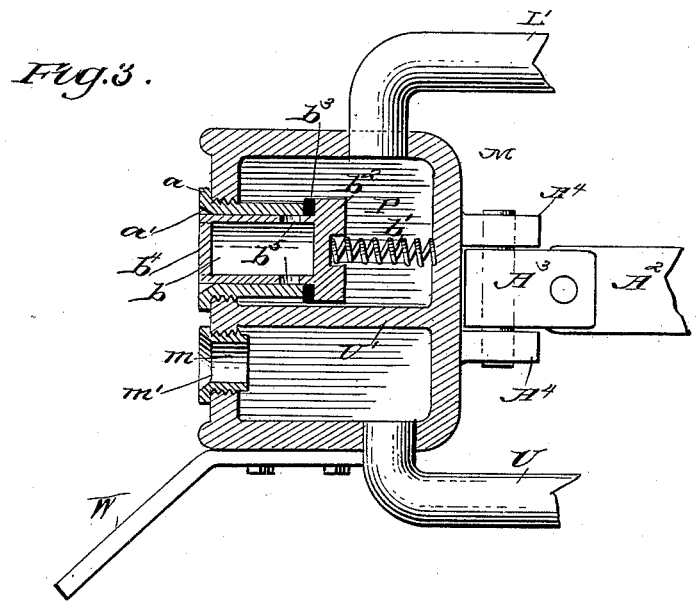
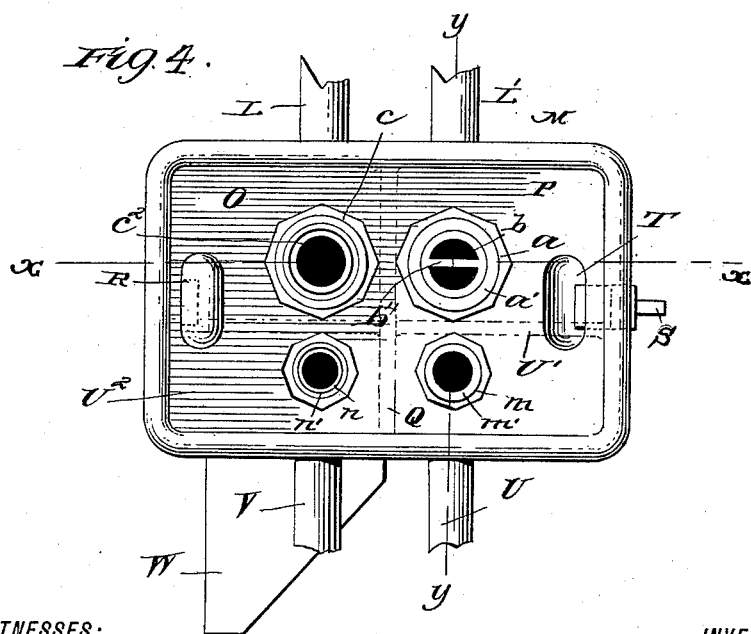
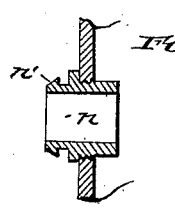
WITNESSES:
W. R. Davis
C. Sedgwick
INVENTOR:
E. S. Graver
BY
Munn & Co.
ATTORNEYS.

UNITED STATES PATENT OFFICE.

ERWIN S. GRAVER, OF PHILADELPHIA, PENNSYLVANIA.

PIPE-COUPLING FOR CAR-HEATERS.

SPECIFICATION forming part of Letters Patent No. 418,408, dated December 31, 1889.

Application filed August 10, 1888. Serial No. 282,434. (No model.)

*To all whom it may concern:*

Be it known that I, ERWIN S. GRAVER, of Philadelphia, in the county of Philadelphia and State of Pennsylvania, have invented a new and Improved Pipe-Coupling, of which the following is a full, clear, and exact description.

My invention relates to improvements in couplers for uniting the pipes through which the heating medium employed in heating railway-cars passes, said couplers being automatic in their action upon the backing of the cars together.

The invention consists in the particular construction and arrangement of parts, as hereinafter fully described, and pointed out in the claims.

Reference is to be had to the accompanying drawings, forming a part of this specification, in which similar letters of reference indicate corresponding parts in all the figures.

Figure 1:
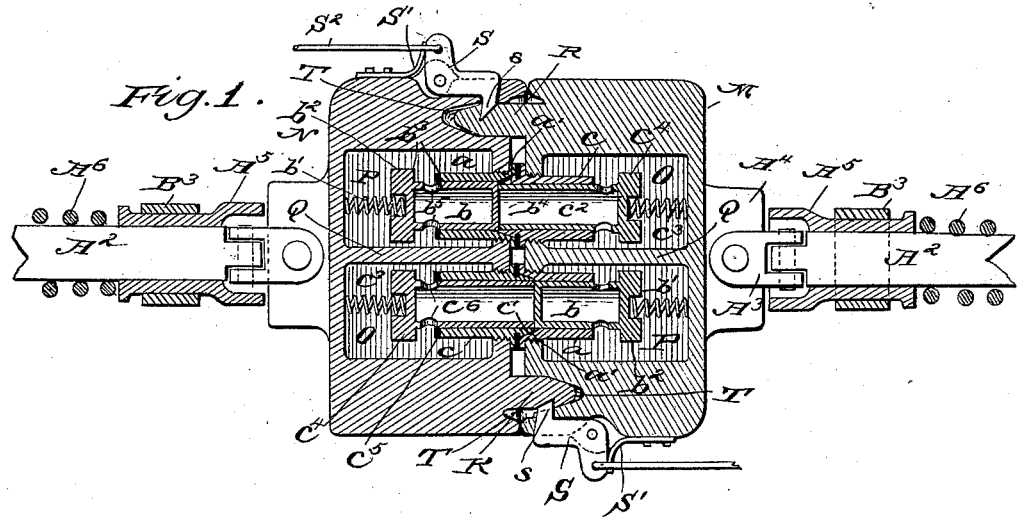
Figure 2:
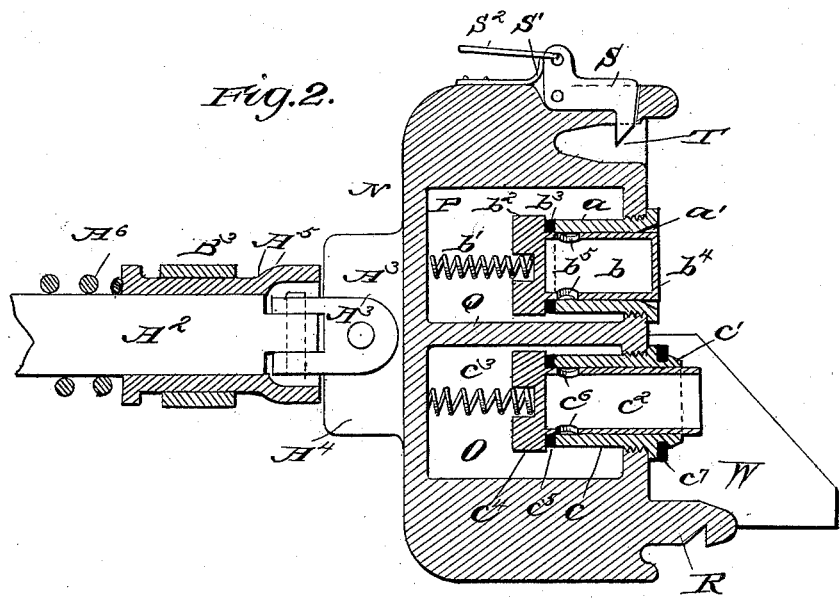

Figure 1 is an enlarged sectional plan view of the couplers united, the section being taken on line $x\ x$ of Fig. 4. Fig. 2 is a similar view of one of the couplers, showing the valves closed. Fig. 3 is a sectional elevation on line $y\ y$ of Fig. 4. Fig. 4 is a front elevation of one of the couplers, and Fig. 5 is a detailed sectional view of the lower corner of the coupler.

M N represent the automatic pipe-couplers, which are reverse duplicates of each other, rights and lefts. The couplers are provided with the chambers O P, formed by the vertical partition Q, and from the said chambers lead the supply and return pipes L L'. In the face-plate of each coupler is fitted a sleeve $a$, projecting into the chamber P and made slightly concaved at $a'$ at its outer end. In the sleeve $a$ is fitted a hollow sliding valve $b$, which is normally pressed forward by the spring $b'$ to cause flange $b^2$ of the valve to press against the washer $b^3$ and close the sleeve $a$, as shown in Fig. 2. The outer end of the valve $b$ is formed with the narrow cross-piece $b^4$, (see Fig. 4,) and through its sides are formed passages $b^5$, through which the heating medium passes when the said valve is pressed inward, as shown in Fig. 1, when the two couplers are brought together. In the face-plate of each coupler is also fitted a sleeve $c$, projecting into the chamber O and formed at the outer end with an annular and beveled collar $c'$ to fit in the socket $a'$ of the opposite sleeve $a$ in the opposite coupler to form a tight joint. In each sleeve $c$ is fitted a hollow sliding valve $c^2$, open at the outer end and normally held forward by the spring $c^3$, so that the collar $c^4$ thereof will press against the washer $c^5$ and close the sleeve $c$ liquid-tight, and when so closed the outer ends of the valves $c^2$ project from the ends of the sleeves $c$, as shown in Fig. 2.

When the two couplers are brought together, the valve $b$ of each coupler will strike the outer end of each valve $c^2$, and both valves will be forced inward, opening the valves through the passages $b^5$ and $c^6$, as shown in Fig. 1, and the annular and beveled collar $c'$ of each coupler is thrust into the beveled socket $a'$, so that the heating medium passes readily from one coupler to the other.

When the couplers are separated, the springs $b'\ c^3$ instantly seat the valves $b\ c^2$ and prevent all escape of the heating medium.

The couplers are locked together by the notched projections R and pivoted hooks S, the latter being acted on by springs S' to engage the notches of the said projections. The face of each coupler is recessed at T to receive the projections R, and the points $s$ of the hooks S reach into said recesses and are beveled, so that when the projections are thrust into the recesses by the backing of the cars together the hooks will be automatically forced out until reached by the notches of the projections, into which they will drop, thus effecting the automatic coupling. Rods or chains $S^2$ enable the hooks S to be withdrawn.

U, Figs. 3 and 4, represents the air-brake pipe connected to the bottom of each coupler, entering a chamber formed by partitions Q and U'. In the front of this chamber is fitted a sleeve $m$, flared at its outer end, as at $m'$. (See Fig. 3.) Each coupler is also provided with a tube $n$, formed with the beveled outer edge $n'$, as shown in Fig. 5. This beveled edge is adapted to enter the opposing beveled edge $m'$ of the tube $m$ when the couplers are locked together. The tube $m$ enters a corner chamber $U^2$, (shown in Fig. 4,) and from this leads a pipe V, fitted in each coupler, so that when the two couplers are connected the tubes $m\ n$ make connections through the lower chambers of the couplers of the pipes V with the pipes U. One set of pipes is for operating the air-brakes and the other for operating a pneumatic signal in case one is used. If the air-brake be not used, the pipes U V and the tubes $m\ n$ will be omitted.

In order to insure the proper facing of the two couplers when the cars are backed together, I provide each at the bottom with an inclined plate or arm W, which act to lift or depress, or both, the couplers, so that the valves and tubes will always properly register.

While the couplers may be connected to the cars in various ways, I prefer to use the bars $A^2$.

The couplers are connected to the front end of each bar $A^2$ by a universal joint, which permits vertical and lateral movement. The said joint in this instance is composed of the short link $A^3$, attached to the bar $A^2$ by a horizontal pivot, and the check-pieces $A^4$ at the back of the coupler, pivoted to the link $A^3$ by a vertical pivot.

Each coupler is prevented from dropping or hanging to either side at the universal joint by means of a sliding sleeve $A^5$, placed on the bar $A^2$, and a coiled spring $A^6$, also placed on said bar to act between the rear end of the sleeve $A^5$ and the hanger $B^2$, so that the said sleeve is forced constantly forward against the rear end of the coupler, thus serving to straighten the coupler when there is no strain upon it, and when there is strain upon it, as in the up-and-down or sidewise sway of the cars in motion, the sleeve and spring will yield and permit the coupler to partake of said swaying motion.

Having thus fully described my invention, I claim as new and desire to secure by Letters Patent—

1. The pipe-coupler M, having connected with it the pipes L L' and provided at its face with the sleeves $a\ c$, in combination with the sliding valves $b\ c^2$, placed in said sleeves and acted upon by springs $b'\ c^3$, substantially as described.

2. The coupler M, having pipes L L' and U V, and provided at its face with the sleeves $a\ c$ and $m\ n$, in combination with the automatic valves $b\ c^2$, acted on by springs, the sleeves $m\ n$ being oppositely beveled, substantially as described.

3. The coupler M, provided in its face with the sleeve $a$, beveled at $a'$, and provided also with the sleeve $c$, having the beveled projection $c'$, in combination with sliding valves $b\ c^2$, placed in said sleeves, respectively, substantially as described.

4. The pipe-coupler connected to a bar $A^2$ by a universal joint, in combination with the sliding sleeve $A^5$, placed on said bar and pressed against the rear end of the coupler by a coiled spring $A^6$, substantially as described.

ERWIN S. GRAVER.

Witnesses:
C. J. SCHOCK,
N. K. GERY.